Feb. 23, 1932. C. S. BRAGG ET AL 1,846,023
POWER ACTUATOR
Original Filed Nov. 1, 1927 5 Sheets-Sheet 3
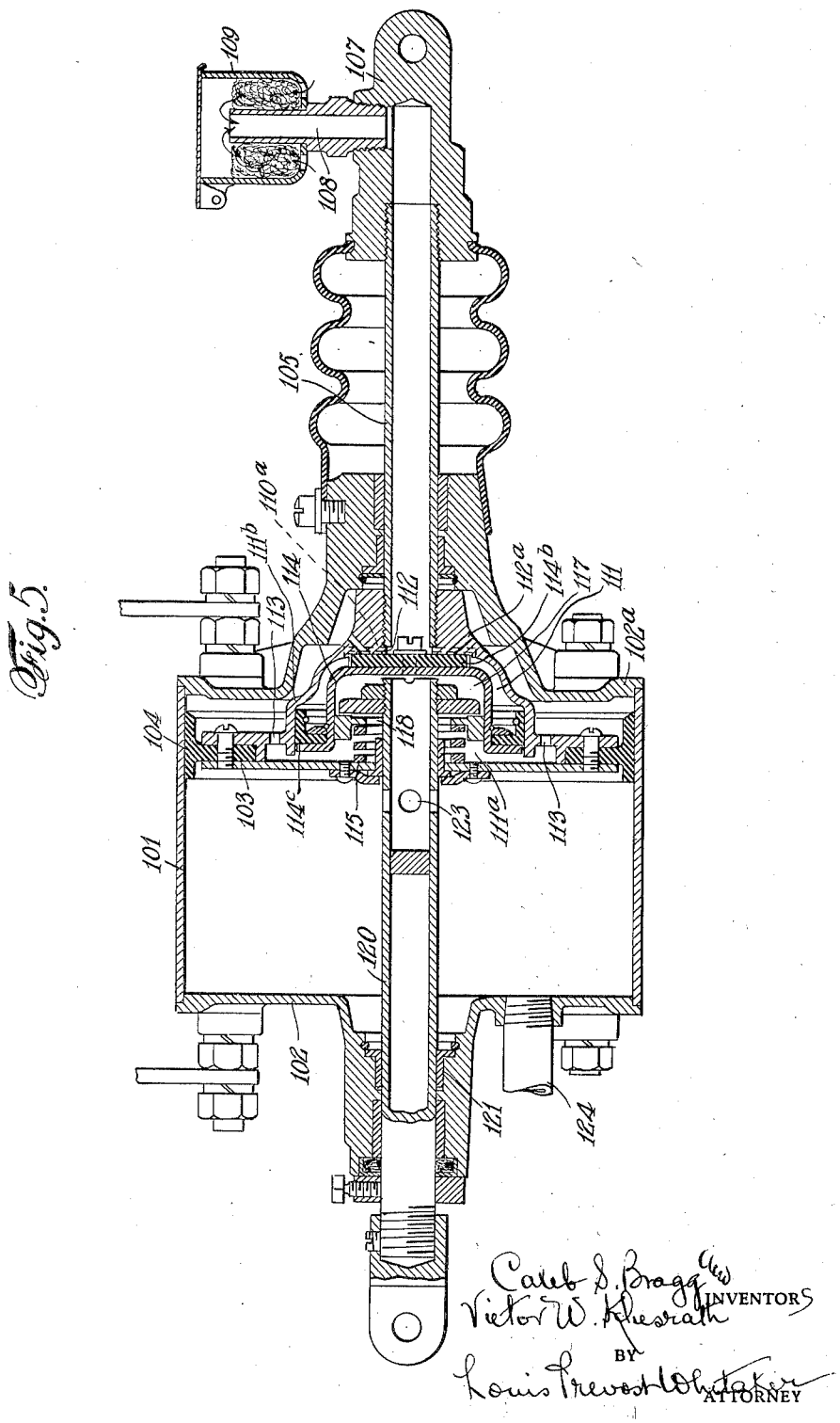

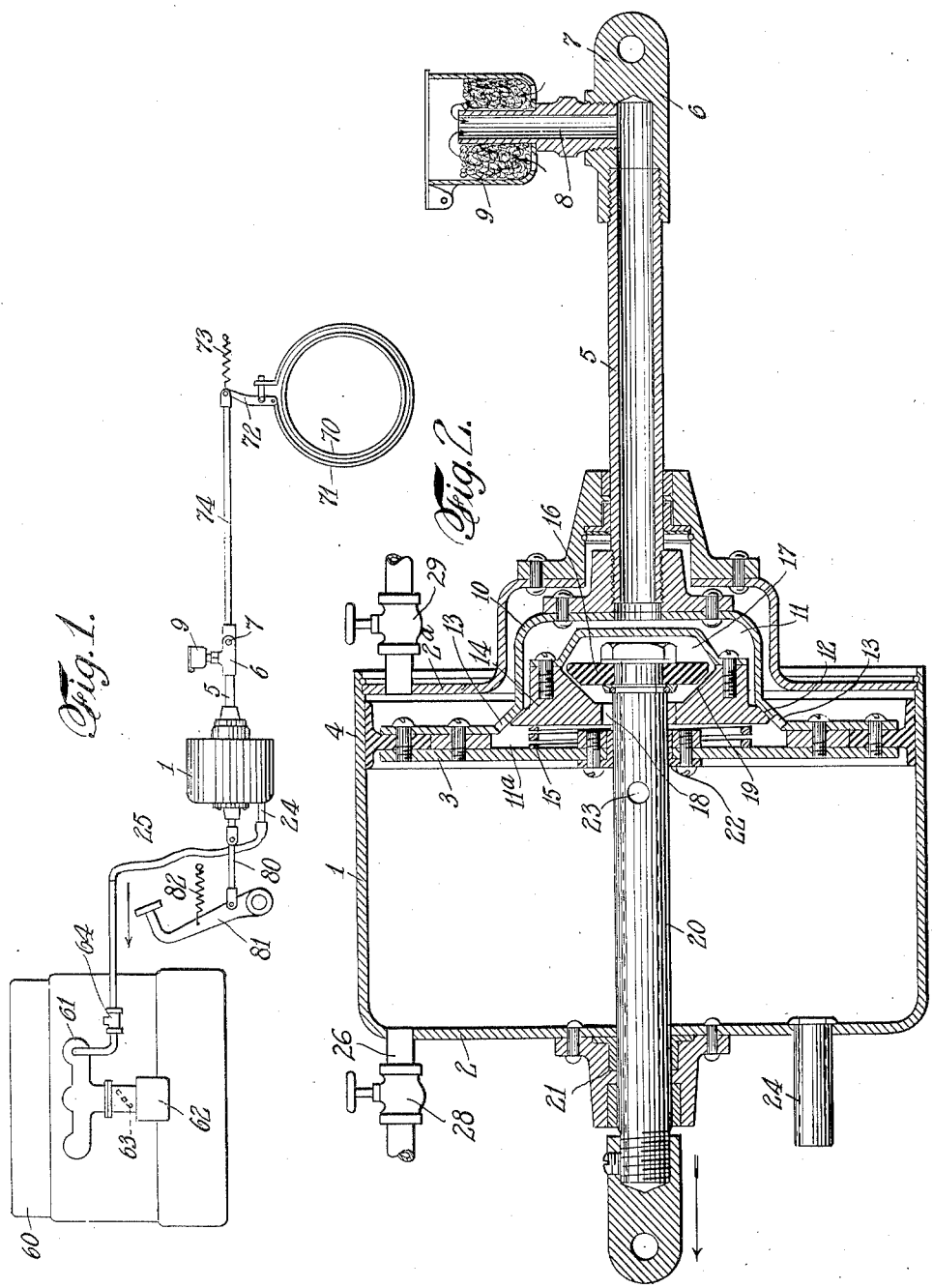

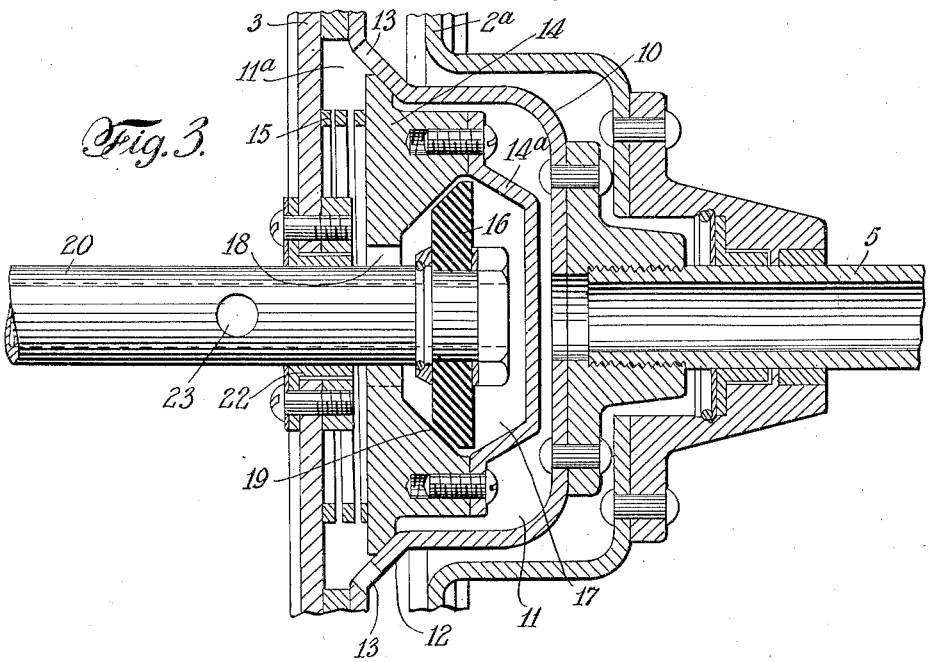
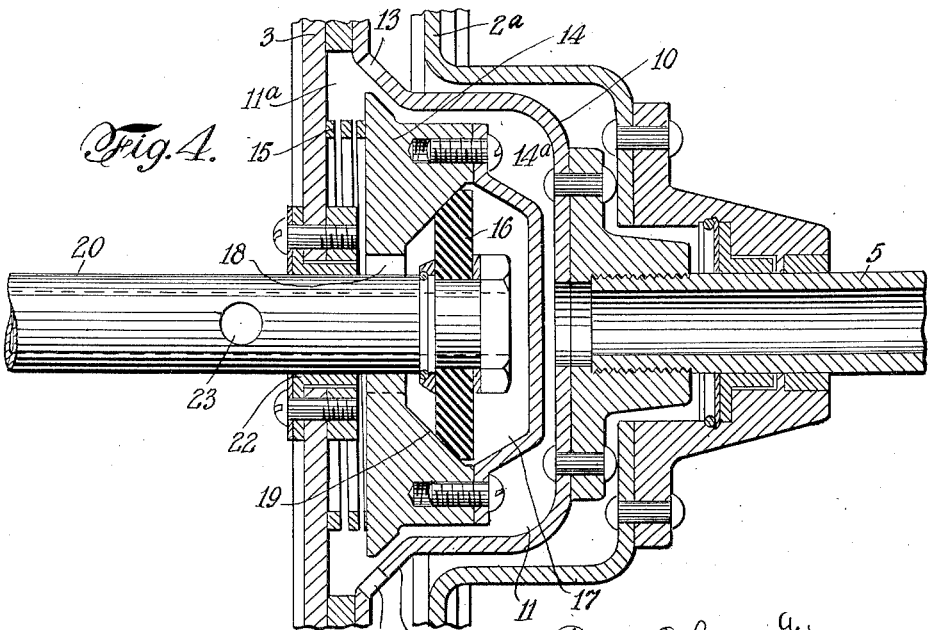

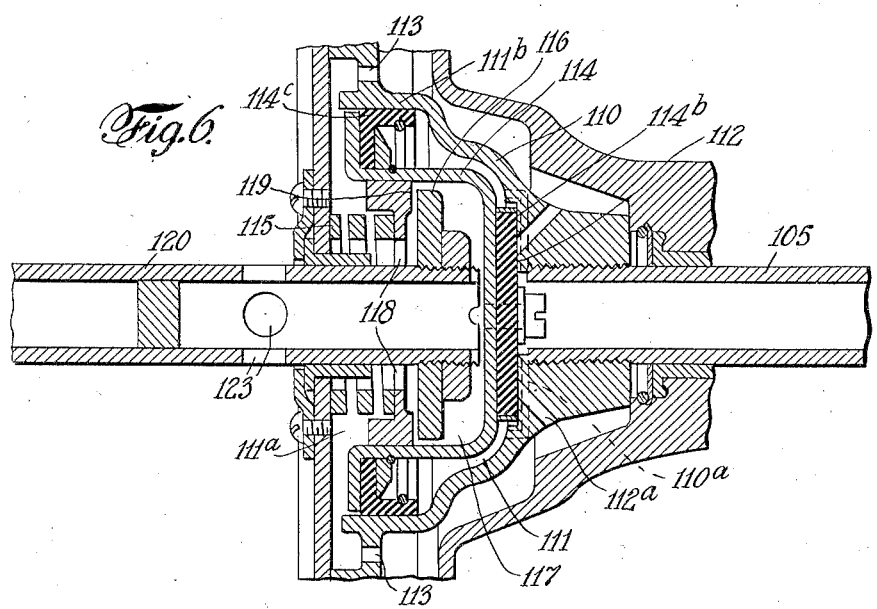
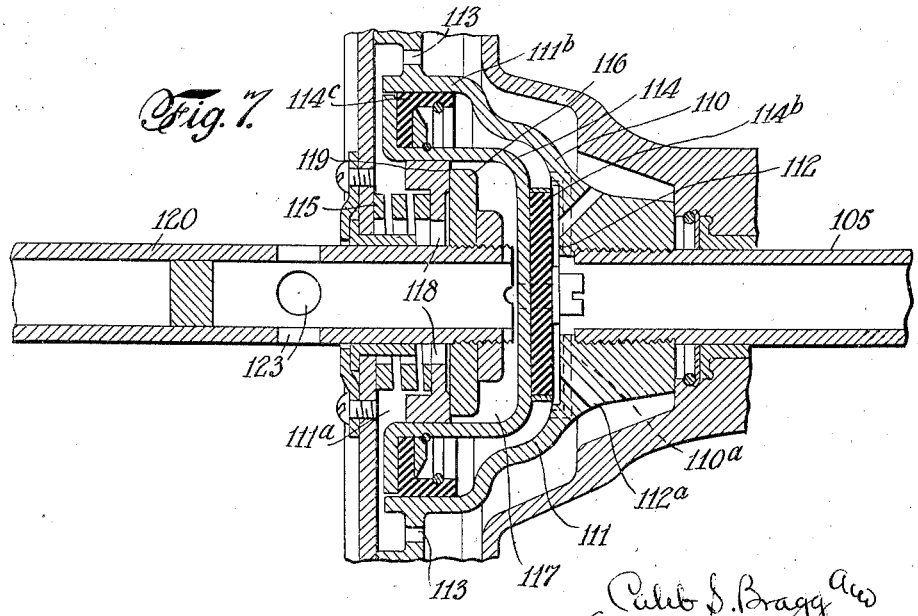

Feb. 23, 1932. C. S. BRAGG ET AL 1,846,023
POWER ACTUATOR
Original Filed Nov. 1, 1927 5 Sheets-Sheet 5
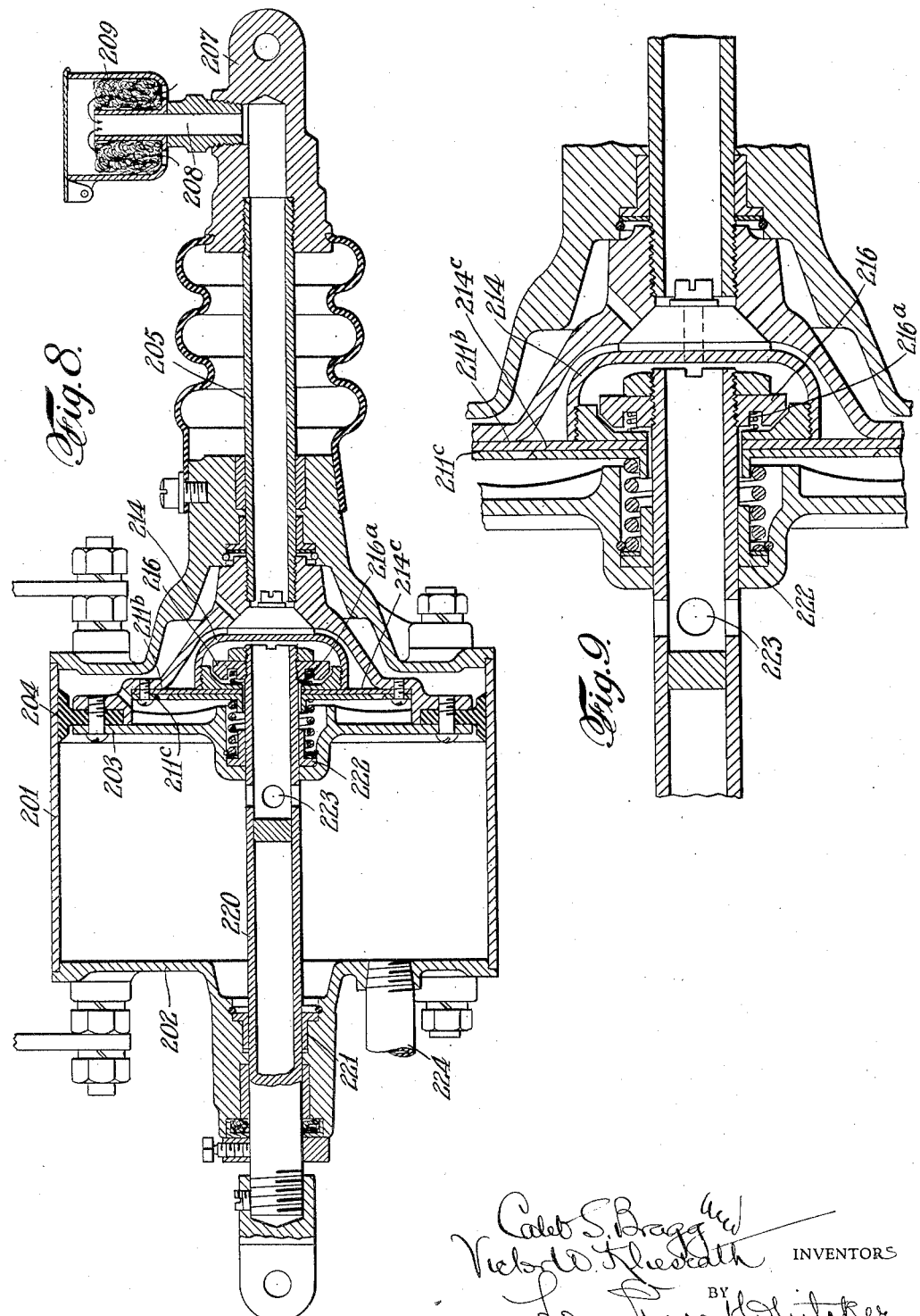

Patented Feb. 23, 1932

1,846,023

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

POWER ACTUATOR

Application filed November 1, 1927, Serial No. 230,223. Renewed January 28, 1931.

Our invention consists in the novel features hereinafter described, reference being had to the accompanying drawings which show two embodiments of the invention selected by us for purposes of illustration, and the said invention is fully disclosed in the following description and claims.

Our invention is an improvement in power actuators for use in connection with automotive vehicles, and especially for operating the brake mechanism thereof, and it has for its object to provide means whereby the operator is enabled to determine by the increased resistance to the operator operated part, connected with the valve mechanism of the actuator, as for example, by the increased pressure against his foot where a pedal lever is employed, to actuate the valve mechanism, how much pressure the piston of the actuator is exerting on the brakes or other part to be actuated.

According to our present invention, variations in the differential of fluid pressures on opposite faces of both the higher pressure valve and lower pressure valve, operate to increase the initial resistance to the movement of the operator operated part as the higher pressure fluid is admitted to the cylinder of the actuator to effect a power stroke of the piston therein to apply the brakes or actuate the part connected with said piston.

Referring to the accompanying drawings, Fig. 1 is a diagrammatic view illustrating an installation in an automotive vehicle of a power actuator connected with the brake mechanism for the vehicle, and deriving its suction from the intake manifold of the engine and embodying our invention.

Fig. 2 is an enlarged sectional view of the actuator shown in Fig. 1.

Fig. 3 is a still further enlarged sectional view of the valve mechanism of the actuator, showing the position of the valve in the normal or retracted position of the piston.

Fig. 4 is a view similar to Fig. 3, showing the position of the valve mechanism when moved to effect the power stroke of the piston and apply the brakes.

Fig. 5 is a view similar to Fig. 2, showing a slightly modified form of the valve mechanism for the actuator.

Fig. 6 is an enlarged sectional view of the valve mechanism shown in Fig. 5, the valves being shown in the positions which they occupy when the piston is in the off or retracted position.

Fig. 7 is a similar view showing the valves in position to effect a power stroke of the piston.

Fig. 8 is a sectional view similar to Fig. 2, showing another slightly modified form of our invention.

Fig. 9 is an enlarged sectional view of the valve mechanism shown in Fig. 8.

In Figs. 1 to 4 inclusive, we have shown an embodiment of the invention, in which the actuator is provided with valve mechanism located in the piston and constructed to normally maintain the piston submerged in vacuum when the piston is in its retracted position. The actuator comprises in this instance the cylinder, 1, closed at both ends by heads, 2, 2a, and provided with a piston, 3, having the usual gasket, 4. The piston hub, indicated at 10, is provided with a chamber, 11, within the same, having a valve seat, 12, which is engaged by the higher pressure valve, 14, which when seated, separates the outer portion of the hub chamber, 11, from the inner portion, 11a, which latter portion communicates by ports, or passages, 13, with the interior of the cylinder, in rear of the piston. The higher pressure valve, 14, is of considerable diameter, and is provided with opposite faces of substantially equal pressure areas, and said valve is normally held seated by yielding resistance means, as a spring or a plurality of springs, in this instance, a resistance spring, 15, interposed between the valve, 14, and the part connected with the piston, and therefore connected with the part to be operated thereby. The piston hub is connected with a piston rod, 5, preferably a hollow piston rod, as shown, which communicates with the chamber, 11, in the piston hub at its inner end, and with the atmosphere, or other source of higher fluid pressure at the outer end. In this instance we have shown the piston rod provided at its outer end with a cap, 6, provided with an attaching lug, or ear, 7, and having an air inlet aperture, 8, provided in this instance with a dust cap, 9, but obviously the inlet aperture, 8, could be connected with a source of pressure higher than atmospheric, if desired. It will thus be seen that the higher pressure valve, 14, is at all times subjected on its outer face to the higher pressure fluid and that its inner face is subjected to the pressure within the chamber, 11a, and the portion of the cylinder in rear of the piston. The diameter of the valve, 14, and the calibration of the spring, 15, are so related that when the valve, 14, is in closed position, the fluid pressure on its outer face will very nearly counterbalance the pressure of the resistance spring, 15, when the inner face of the valve, 14, is exposed to the lower fluid pressure, in this instance suction, that is to say, when the differential of fluid pressures on opposite faces of the valve, 14, are at maximum, and the spring, 15, will be sufficiently strong to offer material resistance to the operator operated part when the latter is moved in a direction to move the valve, 14, away from its seat, 12, which forms a stop to limit its closing movement, when the pressures on opposite faces of the valve, 14, are substantially equalized and the differential of said fluid pressures is at minimum.

In the present instance the suction valve, or lower pressure valve, 16, is located in a valve chamber, 17, in the higher pressure valve, in this instance formed by recessing the outer face of the valve, 14, and providing it with a cap or closure, 14a, to form the chamber, 17, which is in communication with the chamber, 11a, by means of suitable passage, or passages, 18, the valve, 14, being provided within the chamber, 17, with a valve seat, 19, against which the suction valve seats, by a movement in the reverse direction from the seating movement of the higher pressure valve, 14. The suction or lower pressure valve, 16, is secured to the inner end of a valve actuating part, 20, in this instance a hollow sleeve, which extends through a suitable sealing member, or stuffing box, 21, in the head, 2, of the cylinder, and through a suitable sealing member, 22, in the piston, and is provided just forward of the piston, with an aperture, or apertures, 23, in such position that it will not be drawn within the sealing member, 21, by the effective stroke of the piston. The inner end of the sleeve, 20, communicates with the chamber, 17, in rear of the suction valve. The portion of the cylinder forward of the piston is connected at all times with the source of lower pressure, and in this instance is shown provided with an outlet pipe, 24, connected by a suction pipe, 25, with the suction passage, 61, i. e., the intake manifold, of an internal combustion engine for propelling the vehicle, indicated at 60, provided with the usual carburetor, 62, and throttle valve, 63, the pipe, 25, being connected with the suction passage between the throttle valve and the engine cylinders, and preferably provided with a check valve, 64, opening in a direction toward the manifold.

As indicated in Fig. 1, the piston rod, 5, is adapted to be connected to the part to be actuated, in this instance brake mechanism for the vehicle, which may be of any preferred type, and operating in connection with two or more wheels of the vehicle. In Fig. 1 the brake mechanism is illustrated, diagrammatically, as a brake drum, 70, provided with a brake band, 71, brake operating lever, 72, retracting spring, 73, the lever, 72, being shown connected with the piston rod, 5, by a link, 74. The valve actuating part, 20, is connected with an operator operated part, and in this instance we have shown it connected by a link, 80, with a pedal lever, 81, provided with a retracting spring, 82, which normally holds the pedal lever in position to maintain the suction valve open, and, as hereinafter explained, need only be strong enough to counteract the weight of the pedal and the friction of the parts.

When the parts are in normal or released position, the suction or lower pressure valve, 16, is opened and the higher pressure valve, 14, closed, as indicated in Figs. 2 and 3, and the engine is running, the suction of the manifold will maintain the cylinder on both sides of the piston in a state of rarefication, and the piston submerged in vacuum, the air in the cylinder forward of the piston being withdrawn directly through the suction pipe, 25, and the air in rear of the piston being withdrawn through the ports, 13, in the piston hub communicating with the chamber, 11a, the ports or passages, 18, connecting the chamber, 11a, with the suction valve chamber, 17, and the apertures, 23, and the interior passage in the sleeve, 20, connecting the chamber, 17, with the portion of the cylinder forward of the piston. It will be seen that in this position the higher pressure inlet valve, 14, is exposed on its outer face with a higher pressure fluid in the chamber, 11, and on its inner face, to rarefication in the chamber, 11a, thus providing the maximum differential of fluid pressures thereon, acting in a direction contrary to the pressure exerted by the spring, 15, and nearly counterbalancing the force of said spring, so that a very light initial pressure is required upon the foot pedal to move the higher pressure valve in a direction to open it, and effect a power stroke of the piston. The suction valve being in open position, is subjected to suction on both faces. To apply the brakes, the operator moves the foot lever, 81, forward, in the direction of the arrow, Figs. 1 and 2, which will effect a movement of the valve actuating sleeve in the same direction, bringing the suction valve, 16, into closed position, and opening the higher pressure valve, 14. When the valve, 14, is opened, the higher pressure fluid, in this case, atmospheric air, enters the chamber, 11ª, and passes into the cylinder in rear of the piston, through the ports, or passages, 13, and into the chamber, 17, on the forward side of the suction valve, and immediately building up pressure therein. The fluid pressures on the opposite faces of the higher pressure valve, 14, are gradually equalized, reducing the differential of pressure thereon, and thereby transferring a proportionate amount of the pressure of the resistance spring, 15, to the operator operated part, as the differential of pressures decreases, while the increase in the pressure on the forward side of the suction valve will also be applied to the operator operated part to gradually increase the pressure required to keep the suction valve seated, the rear face of the suction valve being at all times connected with suction. Therefore, as the piston moves forward, and the fluid pressure behind it increases, the operator has to overcome the increasing resistance of the resistance spring, 15, and the fluid pressure on the forward face of the suction valve, or in other words, increasing differential of pressure on the suction valve. The forward movement of the piston applies the brake mechanism and the greater the force exerted upon the braking surfaces, the greater the pressure built up in the cylinder in rear of the piston to effect that pressure, and the greater the force which must be exerted by the operator's foot on the pedal to keep the valve, 14, open and valve, 16, closed, to attain that pressure.

As soon as the forward movement of the operator's foot and the pedal ceases, the piston will overtake the valve actuating part or sleeve, 20, permitting the higher pressure valve, 14, to close, without opening the suction valve, 16, thus holding the brakes applied, but as soon as the valve, 14, closes, the pressure of the resistance spring, 15, will be taken by the valve seat, 12, and the operator's foot is relieved from the pressure of the resistance spring, and has only to overcome the differential of pressures on the suction valve, so that the operator is relieved of a considerable portion of the pedal pressure, in holding the brakes applied for a considerable length of time, as in prolonged or continued braking. If the operator wishes to effect a further pressure on the braking surfaces, however, it will be necessary for him to exert sufficient pressure to compress the resistance spring, or springs, and again effect the opening of the valve, 14, and the pressure of the resistance spring, which he must overcome in addition to the pressure on the forward face of the suction valve will become maximum when the pressure in the cylinder in rear of the piston is equal to the higher fluid pressure, in this case, atmospheric pressure.

To release the brakes, it is only necessary for the operator to remove his foot from the brake pedal or release it sufficiently to permit the pressure on the forward side of the suction valve to again open the suction valve, and equalize the fluid pressures within the cylinders on opposite sides of the piston, the air previously admitted to apply the brakes being withdrawn from both ends of the cylinder through the suction pipe 25. As soon as the suction valve opens there will be an almost immediate equalization of pressures within the cylinder, by transfer from the high pressure side to the low pressure side, permitting an immediate release of the brake mechanism under the action of the retracting means, which will draw back the brake mechanism and the piston to their normal or released, or retracted positions. It will be noted that the opening of the suction valve is effected by the differential of pressures on its opposite faces, acting in the direction opposite that of the arrow in Fig. 2, and tending to hold the suction valve in open position until the pressures within the cylinder are equalized, and until the parts are returned to normal position, so that the spring, 82, does not have to be a strong retracting spring, but need only be strong enough to counteract the weight of the pedal and the friction of the parts, and does not have to overcome any spring, or springs, normally used for holding the suction valve closed, or the atmospheric pressure usually exerted on one face of the suction valve when the rear portion of the cylinder is connected with the source of higher pressure fluid. Due to this construction, a very light initial pressure is possible in operating the foot pedal when this is desired.

It will be noted that the force of the operator applied to the operator operated part, which is effective to compress the resistance spring, 15, is applied to the piston in a direction of the movement of its effective stroke to apply the brakes, hence the reaction of this spring tends to move the piston forward and there is no loss of the physical force of the operator. The force of the operator applied to overcome the differential of fluid pressures on the suction valve, however, does not react upon the piston and does not, therefore, assist in the application of the brake mechanism. It is not, however, entirely lost, as the resistance offered by the differential of pressures on the suction valve, tends to open the suction valve, which eliminates the necessity of a strong retracting spring, as previously stated.

It will be seen that by our invention, the operator is enabled to determine the extent of application of the brakes by the sense of feeling in the same manner as in the application of the ordinary hand or foot operated brake, while holding the brakes applied, he is relieved of a portion of this increased resistance, to wit, that of the spring, 15, by the seating of the valve, 14. It will also be understood that after the brakes are fully applied to the extent of the power of the actuator, the operator may, by further depressing the foot lever, apply his physical force to the brake mechanism through the further compression of the spring, 15, or until the valve strikes the piston, in addition to that of the actuator, and in like manner, should the suction fail for any reason, the brake mechanism may be applied by the physical force of the operator, as the valves are open to vent the cylinder, in which case, also, the force required to compress the spring, 15, would react upon the piston in a direction to effect its forward movement.

By reason of the fact that the physical force exerted by the operator in compressing the retracting spring, 15, is largely conserved and applied to the piston in the direction of its power stroke, a cylinder of smaller size and less weight may be employed to do the same work, with economy of manufacture and convenience in installation, and correspondingly smaller quantities of air are withdrawn into the intake manifold by each operation of the brake.

In Figs. 5, 6, and 7, we have illustrated a slight modification of our invention, in which the seat engaging portion of the higher pressure valve is of considerably less diameter than the body of the valve, the opposite faces of which are exposed to fluid pressure. In carrying out our invention, it is desirable to employ an atmospheric valve having opposite faces of large area exposed to fluid pressure, and in some instances it is possible that the desired diameter of the valve may be so great that when the valve actuating part is operated in a direction to open the valve, it may tip slightly on its seat, providing sufficient opening for the admission of the higher pressure fluid to pass between portions of the seat and coresponding portions of the valve without entirely disengaging the valve from its seat, owing to the slight but practically unavoidable, relative movement between the valve and its actuating part, which will always exist to some extent no matter how accurately the parts are made. Such an operation of the valve would be sufficient to operate the brakes without fully transferring the proper proportion of the pressure of the resistance spring, 15, to the operator operated part.

In Figs. 5, 6, and 7, in which the parts corresponding with those previously described are given the same reference characters, with the addition of 100, the chamber, 111, in the hub, 110, of the piston, 103, is provided with a cylindrical portion, 111$^b$, with which the peripheral portions of the higher pressure valve, 114, make a sealing fit, while permitting a sufficient movement of the seat engaging portion of the valve, indicated at 114$^b$, to open and close ports or passages communicating with the cylinder in rear of the piston. In this instance the sealing is effected by a ring or gasket, 114$^c$, which engages the cylindrical portion, 111$^b$, of the piston hub.

The outer face of the valve, 114, is provided with a seat engaging portion 114$^b$, of considerably smaller diameter than the body of the valve and composed of suitable material, as compressed cork, or cork composition, leather, molded rubber, or any other suitable material, and adapted to engage a valve seat, 112, on the piston hub within the chamber, 111, surrounding the opening which communicates with the atmosphere through the hollow piston rod, 105, and the higher pressure inlet, 108. The valve seat is in this instance provided with a port, or ports, 112$a$, for effecting a communication between the chamber, 111, and the cylinder in rear of the piston when the seat engaging portion of the valve is in open position, and the piston hub is also provided with a by-pass, or by-passes, 110$a$, out of communication with the port, or ports, 112$a$, for effecting communicaiton at all times between the hollow piston rod and the chamber, 111, and thereby normally exposing an area on the outer face of the higher pressure valve much greater than the area of the seat engaging portion, at all times to the pressure of the higher pressure fluid, in this instance the atmospheric pressure.

The valve, 114, is provided with the interior suction or lower pressure chamber, 117, provided with a suction valve seat, 119, adapted to be engaged by the suction valve, 116, secured to the valve actuating part, or sleeve, 120, which is mounted and operates in the manner previously described. The valve, 114, is also provided with an aperture, or apertures, 118, for placing the suction chamber, 117, in communication with the portion, 111$a$, of the piston hub chamber, 111, which is at all times in communication with the cylinder in rear of the piston through passages, 113. 115 represents the resistance spring, which is interposed between part of the piston and the higher pressure inlet valve 114.

The operation of the actuator is exactly the same as hereinbefore described with reference to Figs. 1 to 4, except that in this construction the seat engaging portion of the higher pressure valve is of much less area and diameter than the valve portions exposed to fluid pressures and providing the variable differential of fluid pressures, as hereinbefore described, so that in the operation of the valve actuating part, to close the suction valve and open the higher pressure valve, the seat engaging portion, 114ᵇ, will of necessity be moved bodily from its seat, and the transfer of the resistance of the spring, 115, to the operator operated part in accordance with the decrease in the differential of fluid pressures on opposite faces of the higher pressure valve, is assured, and the possibility of having a portion of the load of this spring carried by the valve seat, and thereby defeating the object of the invention, is positively prevented.

It is obvious that a diaphragm type of seal for the higher pressure valve could be employed as shown in Figs. 8 and 9, which illustrate another modification of our invention, in which figures the parts corresponding with those previously described with reference to Figs. 1 to 4, inclusive, are given the same reference characters with the addition of 200.

In this embodiment of our invention the sealing of the higher pressure valve, 214, is effected by a diaphragm, 214ᶜ, the outer portions of which are in sealing engagement with the valve casing, being clamped between an annular portion, 211ᵇ, and a clamping ring, 211ᶜ, the inner portion of the diaphragm being in sealing engagement with the valve body as shown.

In Figs. 8 and 9, we have also shown a relatively light spring, indicated at 216ᵃ, interposed between the suction valve, 216, and its seat, and having sufficient power to overcome the friction of the stuffing box, 221, in the end of the cylinder, and the stuffing box or sealing member, 222, in the piston, through which the valve actuating part, 220, passes. In this construction the retracting spring, 82, for the foot pedal will be made only sufficiently strong to counterbalance the weight and friction of the foot pedal.

The operation of this form of our invention will be precisely the same as that previously described with respect to the embodiment shown in Figs. 5 to 7 inclusive, the diaphragm, 214ᶜ, permitting the necessary movement of the valves with respect to the casing. In this construction when the operator releases the foot pedal after an application of the brakes, the differential of fluid pressures on opposite faces of the suction valve at once forces it away from its seat into open position to effect an equalization of pressures in the cylinder on opposite faces of the piston, and also effecting an equalization of pressures on opposite faces of the valve, as hereinbefore described, and permit the piston to be retracted by the draft of the brakes and their retracting springs, and the spring, 216ᵃ, will maintain the valve 216, unseated against the friction of the stuffing box, 221, on the valve actuating part, 220, so that this friction will not reseat the suction valve after equalization of fluid pressures on its opposite faces. During the return movement of the piston, the friction between the sealing member, 222, and the piston, will naturally help the spring, 216ᵃ, to overcome the friction of the stuffing box, 221. The spring, 216ᵃ, is made sufficiently strong, however, to overcome the friction of both the stuffing box, 221, and the sealing member, 222, in the piston, to insure the unseating of the suction valve in case of failure of power for any reason, in order to place the valves and maintain them in position to vent the cylinder in such case, and permit the release of the brake mechanism and the return of the piston to its retracted position.

It is obvious that the brake mechanism could operate more than one actuator, and in Fig. 2, for example, we have shown the cylinder, 1, provided with pipes, 26 and 27, for connecting the ends of the cylinder with corresponding portions of a valveless cylinder, or cylinders, having independent piston or pistons therein, which can be connected to the same or other brake mechanisms, for example, on the same vehicle, or a trailing vehicle, said pipes being shown provided with cut off cocks, 28 and 29, when the additional cylinder or cylinders are not in use.

It will also be understood that the valve mechanism herein shown as being located in the piston of the actuator may be located in a cylinder exterior to the valve casing, if desired, as shown in our former application for Letters Patent of the United States filed June 17, 1927, Serial No. 199,477, for example, the valve casing being preferably connected in linkage between the operator operated part and the brake mechanism, as therein shown.

In the operation of our invention, it will be noted that a very slight movement of the pedal, one sixteenth of an inch, or even less, will operate the valve mechanism to effect a power stroke of the piston of the actuator and secure the reactionary pressure effect upon the foot of the operator, in contradistinction to the type of valve mechanism in which a reactionary effect is obtained by a spring interposed between the foot lever and a diaphragm or piston valve, which is compressed by pressure building up behind the diaphragm or piston, which returns the valve mechanism to neutral position from which it can be again opened by a further compression of the spring, requiring a much greater movement of the pedal. As the maximum pedal throw is necessarily limited, our invention presents an important advance in this respect, and obviates frequent adjustments of the brakes, which would otherwise be necessary to prevent the foot lever from reaching its limit of movement before obtaining the full application of the brakes.

What we claim and desire to secure by Letters Patent is:—

1. In a power actuator, a cylinder closed at both ends, a piston therein provided with means for connecting it with a part to be operated, means for connecting the cylinder with sources of high and low pressure, and valve mechanism for controlling said high and low pressures to said cylinder comprising a high pressure valve, means for subjecting opposite faces of said high pressure valve to maximum differentials of fluid pressure when the piston is in retracted or off position, means for operating said valve to control the differentials of fluid pressure to the piston, and means offering a resistance to the operating means in substantial proportion to the decrease in differentials of pressure on opposite sides of said valve to produce an index of the amount of force exerted on the part to be operated.

2. In a power actuator, a cylinder closed at both ends, a piston therein provided with means for connecting it with a part to be operated, means for connecting the cylinder with sources of high and low pressures, and valve mechanism for controlling said higher and lower fluid pressures to said cylinder comprising a higher pressure valve and a lower pressure valve, means for subjecting opposite faces of the higher pressure valve to maximum differentials of fluid pressure when the piston is in retracted or off position and simultaneously subjecting the lower pressure valve to the lower pressure on both faces thereof, and means for operating said valves to decrease the differential of fluid pressure on opposite sides of the high pressure valve and increase the differential of fluid pressure on opposite faces of the low pressure valve and causing the higher pressure to act on said low pressure valve in a direction opposite the movement of the operating means to produce a reaction on the operating means and thus produce an index of the amount of force exerted on the part to be operated.

3. In a power actuator, a cylinder closed at both ends, a piston therein provided with means for connecting it with a part to be operated, means for connecting the cylinder with sources of high and low pressure, and valve mechanism for controlling said high and low pressures to said cylinder comprising a high pressure valve, means for subjecting opposite faces of said high pressure valve to maximum differentials of fluid pressure when the piston is in retracted or off position, means for operating said valve to control the differentials of fluid pressure to the piston, and a resistance element acting against said valve and the high pressure fluid and arranged to transfer its resistance to the operator operated part in proportion to the decrease in differentials of fluid pressures when the valve is open, said resistance means acting on the piston in a direction to produce a power stroke thereof.

4. In a power actuator, a cylinder closed at both ends, a piston therein provided with means for connecting it with a part to be operated, means for connecting the cylinder with sources of high and low pressures, and valve mechanism for controlling said higher and lower fluid pressures to said cylinder comprising a higher pressure valve and a lower pressure valve, means for subjecting opposite faces of the higher pressure valve to maximum differentials of fluid pressure when the piston is in retracted or off position and simultaneously subjecting the lower pressure valve to the lower pressure on both faces thereof, means for operating said valves to decrease the differential of fluid pressure on opposite sides of the high pressure valve and increase the differential of fluid pressure on opposite faces of the low pressure valve and causing the higher pressure to act on said low pressure valve in a direction opposite the movement of the operating means to produce a reaction on the operating means and thus produce an index of the amount of force exerted on the part to be operated, and means acting when the differentials of pressure on the high pressure valve are reduced to supplement the action of the high pressure on the low pressure valve.

5. In a power actuator, the combination of a cylinder closed at both ends, a piston therein, provided with means for connecting it with a part to be operated, controlling valve mechanism, and means for connecting the cylinder with sources of higher and lower fluid pressures under the control of said valve mechanism, said valve mechanism comprising among its members a higher pressure valve and a lower pressure valve movable with and with respect to said piston and movable with respect to each other, an operator operated part, connected with said valves by means for effecting the closing of one and the opening of the other when moved in either direction, yielding resistance means interposed between a part connected with the piston and one of said valves, and acting thereon in a direction to close it, said valve having one of its faces exposed at all times to the higher fluid pressure in a direction to open the valve, and the other face subjected to the pressure within the cylinder on the rear side of the piston, said resistance means having sufficient power to offer material resistance to the operation of the operator operated part in a direction to effect the opening of said valve, the other of said valves having one of its faces always exposed to the lower fluid pressure, and the other face exposed to the pressure in said rear portion of the cylinder when the valve is closed, said pressure acting in a direction tending to open said valve when a differential of pressure exists on its opposite faces, and being constructed to transmit the differential of fluid pressure thereon to the operator operated part.

6. In a power actuator, the combination of a cylinder closed at both ends, a piston therein provided with means for connecting it with a part to be operated, controlling valve mechanism and means for connecting the cylinder with sources of higher and lower fluid pressure, under the control of said valve mechanism, said valve mechanism comprising among its members a higher pressure valve and a lower pressure valve, an operator operated part connected with said valves by means for effecting the closing of one and the opening of the other when moved in either direction, the higher pressure valve being provided with opposite faces, one of which is exposed at all times to the higher fluid pressure in a direction tending to open the valve, and the other of which is subjected to the pressure within the cylinder on the rear side of the piston, yielding resistance means acting in a direction to normally close said valve, said valve being of such area that said resistance means have sufficient power to offer material resistance to the movement of the operator operated part in a direction to effect the opening of said valve when the fluid pressures on said valve are equalized, and being nearly counterbalanced by the maximum differential of fluid pressures on said valve, the lower pressure valve having opposite faces, one of which is exposed at all times to the lower fluid pressure, and the other of which is exposed to the pressure in said rear portion of the cylinder when the valve is closed, tending to open said valve when a differential of fluid pressures on its opposite faces exists, and being constructed to transmit the differential of fluid pressures thereon to the operator operated part.

7. In a power actuator, the combination of a cylinder closed at both ends, a piston therein provided with means for connecting it with a part to be operated, controlling valve mechanism and means for connecting the cylinder with sources of higher and lower fluid pressure, said valve mechanism comprising among its members, a valve casing movable with and connected with the piston, and provided with a valve seat, a higher pressure valve in said casing engaging said seat, and provided with a valve seat, and a lower pressure valve engaging said seat, said valves being movable with respect to said casing and with respect to each other, an operator operated part connected with said valves by means for effecting the closing of one and the opening of the other when moved in either direction, the higher pressure valve being provided with opposite faces, one of which is exposed at all times to the higher fluid pressure in a direction to open the valve, and the other pressure face of which is subjected to the pressure within the cylinder on the rear side of the piston, yielding resistance means interposed between said higher pressure valve and a part connected with the piston and acting on the valve in a direction to hold it in contact with its seat, said resistance means having sufficient power to offer material resistance to the movement of the operator operated part in a direction to move said valve away from its seat when the fluid pressures on the valve are equalized, and being nearly counter-balanced by the higher fluid pressure on said valve when the latter is seated, and exposed to the maximum differential of fluid pressures, the lower pressure valve having opposite faces, one of which is exposed at all times to the lower fluid pressure, and the other of which is exposed to the pressure in said portion of the cylinder when the valve is closed and constructed to transmit the differential of fluid pressures thereon to the operator operated part in a direction opposite to the movement thereof to open the higher pressure valve.

8. In a power actuator, the combination with a cylinder closed at both ends, a piston therein provided with means for connecting it with a part to be operated, controlling valve mechanism and means for connecting the cylinder with sources of higher and lower fluid pressures, said valve mechanism comprising among its members a higher pressure valve having a chamber connected with the source of lower pressure, and a lower pressure valve, an operator operated part connected with the lower pressure valve, the higher pressure valve being provided with opposite faces, one of which is exposed at all times to the higher fluid pressure in a direction to open the valve, and the other of which is subjected to the pressure within the rear portion of the cylinder on one side of the piston, yielding resistance means acting on the valve in a direction to close it, said resistance means having sufficient power to offer material resistance to the movement of the operator operated part in a direction to effect the opening of said valve when the fluid pressures on the valve are equalized and being nearly counterbalanced by the maximum differential of fluid pressures on said valve, the lower pressure being located in the chamber of said higher pressure valve, the opposite faces of said valve being exposed respectively to the lower fluid pressure and to the pressure within said rear portion of the cylinder when the valve is closed, the movement of the operator operated part to close said lower pressure valve effecting the connection of said operator operated part with the higher pressure valve to open it.

9. In a power actuator, the combination with a cylinder, closed at both ends, a piston therein provided with means for connecting it with a part to be operated, means for connecting the cylinder with sources of higher and lower fluid pressures, and controlling valve mechanism comprising a valve casing connected with and movable with the piston and communicating at all times with the pressure portion of the cylinder in rear of the piston and communicating with a source of higher fluid pressure, a higher pressure valve in said casing for disconnecting said portion of the cylinder from the source of higher fluid pressure when the valve is closed, said valve being provided with opposite faces, one of which is exposed at all times to higher fluid pressure acting in a direction to open the valve, and the other of which is subjected to the pressure within said rear portion of the cylinder, yielding resistance means acting on the higher pressure valve in a direction to close it, said resistance means having sufficient power to offer material resistance to the opening movement of the valve when the fluid pressures on the valve are equalized and being nearly counterbalanced by the pressure of the maximum differential of fluid pressures on said valve, said valve being provided with a valve chamber communicating at all times with said portion of said valve casing in communication with the cylinder, said chamber being connected with the source of lower pressure, a lower pressure valve in said chamber for disconnecting said portion of the cylinder in rear of the piston from the source of lower pressure when said valve is closed, the opposite faces of said valve being exposed respectively to the source of lower pressure and to the pressure in said portion of the cylinder in rear of the piston when in closed position, and an operator operated part connected with the lower pressure valve and adapted to be brought into connection with the higher pressure valve when the lower pressure valve is closed, to effect the opening of the higher pressure valve.

10. In a power actuator, the combination with a cylinder closed at both ends, a piston therein provided with means for connecting it with a part to be operated, means for connecting the cylinder with sources of higher and lower fluid pressures, and controlling valve mechanism comprising a higher pressure valve provided with opposite faces of considerable pressure area, means for exposing one of said faces at all times to higher fluid pressure acting in a direction to open the valve, the other face being subjected to the pressure within the rear portion of said cylinder, yielding resistance means interposed between said valve and a part connected with the piston and acting on the valve in a direction to close the same, said resistance means having sufficient power to offer material resistance to the movement of the valve away from its seat when the fluid pressures on the valve are equalized and being nearly counterbalanced by the maximum differential of fluid pressures on said valve, a lower pressure valve having its opposite faces exposed respectively to the lower fluid pressure and to the pressure in said rear portion of the cylinder when in closed position, and an operator operated part operatively connected with said valve for effecting the seating of one valve and the opening of the other when moved in either direction.

11. Valve mechanism for controlling the operation of power actuators, comprising among its members a normally closed valve, controlling passages for effecting the operation of the actuator or actuators controlled thereby, means for exposing one face of said valve at all times to the higher fluid pressure in a direction to open the valve and for exposing the other face to the fluid pressure within the rear portion of the cylinder, sealing means for maintaining said differential of fluid pressure when the valve is closed, an operator operated part connected with said valve for moving the same away from its seat, yielding resistance means normally holding the valve seated, said valve having such pressure areas that said resistance means have sufficient power to offer material resistance to the movement of said valve in a direction away from its seat when the fluid pressures on opposite faces of the valve are equalized and being nearly counterbalanced by the higher pressure fluid when the differential of fluid pressures on the valve are at maximum, whereby a movement of the operator operated part in a direction to open said valve will be opposed by very slight resistance, and the movement of said valve will positively disengage the same entirely from its seat and the pressure of said resistance means will be transferred to the operator operated part in proportion to the decrease of the differential of fluid pressures on opposite faces of the valve.

12. In a power actuator, the combination with a cylinder, closed at both ends, a piston therein provided with means for connecting it with a part to be operated, means for connecting the cylinder with sources of higher and lower fluid pressure, and controlling valve mechanism comprising a valve casing connected with and movable with the piston and communicating at all times with the portion of the cylinder in rear of the piston and communicating with the source of higher fluid pressure, a higher pressure valve in said casing for disconnecting said portion of the cylinder from the source of higher fluid pressure when the valve is closed, means for exposing one of the faces of said valve at all times to the higher fluid pressure in a direction to open the valve, the other face being subjected to the pressure within the said rear portion of the cylinder, yielding resistance means interposed between said valve and a part connected with the piston and acting on the valve in a direction to close it, said valve having such area that said resistance means have sufficient power to offer material resistance to the valve in the direction of its opening movement when the fluid pressures on the opposite faces of the valve are equalized, and being nearly counterbalanced by the pressure of the maximum differential of fluid pressures on opposite faces of said valve, said valve being provided with a chamber communicating with a portion of the valve casing at all times and with the portion of the cylinder in rear of the piston, said chamber being connected with the source of lower pressure, a lower pressure valve in said chamber for disconnecting the portion of the cylinder in rear of the piston from the source of lower pressure when the valve is closed, the opposite faces of said valve being exposed respectively to the lower fluid pressure and to the pressure in the said portion of the cylinder in rear of the piston when in closed position, and an operator operated part connected with the lower pressure valve and adapted to be brought into connection with the higher pressure valve when the lower pressure valve is closed, to effect the opening of the higher pressure valve.

13. In a power actuator, the combination with a cylinder, closed at both ends, a piston therein, provided with means for connecting it with a part to be operated, means for connecting the cylinder with sources of higher and lower fluid pressures, and controlling valve mechanism comprising a valve casing, connected with and movable with the piston and provided with a passage communicating at all times with the source of higher fluid pressure, a higher pressure valve in said casing for disconnecting the rear portion of the cylinder from the source of higher fluid pressure when the valve is closed, means for exposing one of the faces of said valve at all times to the higher fluid pressure in a direction to open the valve, and the other of which is subjected to the pressure within said rear portion of the cylinder, said valve normally closing the passage connecting the valve casing with the cylinder in rear of the piston, said casing being provided with means for connecting it at all times with the source of higher fluid pressure, yielding resistance means interposed between said valve and a part connected with the piston and acting on the valve in a direction to close the same, said resistance means having sufficient power to offer material resistance to the valve in the direction of its opening movement when the fluid pressures on the valve are equalized and being nearly counterbalanced by the pressure of the maximum differential of fluid pressures on opposite faces of said valve, said valve having a valve chamber communicating at all times with the portion of the cylinder in rear of the piston, a lower pressure valve in said chamber for disconnecting said portion of the cylinder in rear of the piston from the source of lower pressure when the valve is closed, the opposite faces of said valve being exposed, the one at all times to the lower fluid pressure, and the other to the pressures within said rear portion of the cylinder, an operator operated part connected with the lower pressure valve and adapted to operate the higher pressure valve to open it when the lower pressure valve is closed, whereby a movement of the operator operated part in a direction to effect the opening of the higher pressure valve will insure the transfer to the operator operated part of the pressure of said resistance means in proportion to the decrease of the differential of fluid pressures on opposite faces of the high pressure valve and simultaneously apply to the operator operated part the differential of fluid pressures on opposite faces of the lower pressure valve.

14. In a power actuator, the combination with a cylinder closed at both ends, a piston in the cylinder provided with means for connecting it with a part to be operated, and controlling valve mechanism comprising a valve casing connected with and movable with the piston, communicating at all times with the portion of the cylinder in rear of the piston, and communicating with the source of higher fluid pressure, a higher pressure valve in said casing normally disconnecting said portion of the cylinder from the source of higher fluid pressure, means for exposing one of the faces of said valve at all times to the higher fluid pressure in a direction to open the valve, the other face being subjected to the pressure within the said rear portion of the cylinder, yielding resistance means acting on the valve in a direction to close it, said resistance means having sufficient power to offer material resistance to the valve in the direction of its opening movement when the fluid pressures on opposite faces of the valve are equalized and being nearly counterbalanced by the pressure of the maximum differential of fluid pressures on opposite faces of the said valve, said valve being provided with a chamber connected at all times with the portion of the cylinder forward of the piston and having a passage communicating with a portion of the casing at all times connected with the cylinder in rear of the piston, a lower pressure valve in said chamber for controlling said passage, one face of said valve being exposed to the pressure in the rear portion of the cylinder in rear of the piston, in a direction to open the valve, and the opposite face being exposed at all times to the lower fluid pressure, means for connecting the cylinder forward of the piston with the source of lower pressure, whereby the piston is normally maintained in the lower pressure, and an operator operated part connected with the lower pressure valve and adapted to be connected with the higher pressure valve when the lower pressure valve is closed, to effect the opening of the higher pressure valve.

15. In brake mechanism for an automotive vehicle provided with an internal combustion engine having a suction passage, a throttle valve, and carburetor, a power actuator, comprising a cylinder closed at both ends, a piston therein, operatively connected with brake mechanism for the vehicle, means for connecting the cylinder with the suction passage of the engine and with a source of higher fluid pressure, the combination with controlling valve mechanism including an inlet valve and a suction valve movable with and with respect to said piston, and with respect to each other, an operator operated part operatively connected with said valves by means effecting the closing of one and the opening of the other when moved in either direction, means for exposing one face of said inlet valve at all times to the higher fluid pressure in a direction to open said valve and the other face to the pressure within the cylinder on the rear side of the piston, yielding resistance means interposed between said valve and a part connected with the piston and acting in a direction to normally close said valve against the higher pressure, said resistance means having sufficient power to offer material resistance to the movement of the operator operated part in a direction to open said valve and apply the brakes when the fluid pressures on said valve are equalized and being nearly counterbalanced by the maximum differential of fluid pressures on said valve, the lower pressure valve having opposite faces, one of which is exposed at all times to suction and the other of which is exposed to the pressure in said rear portion of the cylinder when the valve is closed, and being constructed to apply the differential of fluid pressures thereon to the operator operated part, whereby the movement of the operator operated part to apply the brakes will be opposed by a very slight initial resistance, which is gradually increased in substantial proportion to the decrease of the differential of fluid pressure on the higher pressure valve and the increase of the differential of fluid pressure on the lower pressure valve.

16. In brake mechanism for an automotive vehicle provided with an internal combustion engine having a suction passage, a throttle valve and carburetor, a power actuator comprising a cylinder closed at both ends, a piston therein, operatively connected with brake mechanism for the vehicle, means for connecting the cylinder with the suction passage of the engine and with a source of higher fluid pressure, the combination with controlling valve mechanism including an inlet valve and a suction valve movable with and with respect to said piston, and with respect to each other, an operator operated part operatively connected with said valves by means for effecting the closing of one and the opening of the other when moved in either direction and for opening the high pressure valve in the direction of movement of the piston to apply the brakes, means for exposing one face of said inlet valve at all times to the higher fluid pressure in a direction to open said valve and the other face to the pressure within the cylinder on the rear side of the piston, yielding resistance means interposed between said valve and a part connected with the piston and acting in a direction to normally close said valve against the higher pressure, said resistance means having sufficient power to offer material resistance to the movement of the operator operated part in a direction to open said inlet valve and apply the brakes when the fluid pressures on said valve are equalized and being nearly counterbalanced by the maximum differential of fluid pressures on said valve, a stop for arresting said valve sustaining the pressure of said resistance means, the lower pressure valve having one face exposed at all times to suction, and the other face exposed at all times to the pressure in said rear portion of the cylinder and being connected to apply the differential of fluid pressures thereon to the operator operated part, whereby the resistance to the movement of the operator operated part to apply the brakes will be gradually increased by the transfer of the pressure of said resistance means thereto by the decrease in the differential of fluid pressures on the opposite faces of the higher pressure valve and the increase of the differential of fluid pressure on opposite faces of the lower pressure valve, and whereby the seating of the higher pressure valve at any point in the stroke of the piston will arrest the movement of the piston and relieve the operator operated part from the pressure of said resistance means, and the differential of pressures on the lower pressure valve will open it on the release of the operator operated part.

17. In brake mechanism for automotive vehicle, provided with an internal combustion engine having a suction passage, a throttle valve and carburetor, a power actuator comprising a cylinder closed at both ends, a piston therein connected with the brake mechanism for the vehicle, the combination with controlling valve mechanism including a valve casing connected with and movable with the piston, and having portions connected respectively with a source of higher pressure and with the pressure portion of the cylinder in rear of the piston, an inlet valve for disconnecting the cylinder from the source of higher pressures located in said casing and movable with respect thereto, said valve having opposite faces one of which is exposed at all times to the higher fluid pressure in a direction to open the valve and the other exposed to the pressure within said rear portion of the cylinder, yielding resistance means acting on said valve in a direction to normally close it, said resistance means having sufficient power to offer material resistance to said valve in the direction of its opening movement, when the fluid pressures on said valve are equalized and being nearly counterbalanced by the maximum differential of fluid pressures on opposite faces of said valve, said valve being provided with a valve chamber communicating at all times with the rear portion of the cylinder, said chamber being connected with the suction passage of the engine, a suction valve in said chamber for disconnecting said portion of the cylinder in rear of the piston from the suction passage when the valve is closed, an operator operated part connected with the suction valve and constructed to be connected with the inlet valve to open it when the suction valve is closed, whereby the movement of the operator operated part to apply the brakes will close the suction valve and open the inlet valve by overcoming a slight initial resistance, which is gradually increased by the transfer of pressure of said resistance means to the operator operated part by the decrease of the differential of fluid pressures on the inlet valve, and is also increased by the differential of fluid pressures on the lower pressure valve.

18. In brake mechanism for an automotive vehicle provided with an internal combustion engine having a suction passage, a throttle valve and carburetor, a power actuator comprising a cylinder closed at both ends and a piston therein connected with the brake mechanism for the vehicle, the combination with controlling valve mechanism including a valve casing connected with and movable with the piston, and having portions connected respectively with a source of higher pressure and with the portion of the cylinder in rear of the piston, an inlet valve for disconnecting the cylinder from the source of higher pressure located in said casing and movable with respect thereto, said valve having opposite faces one of which is exposed at all times to the higher fluid pressure in a direction to open the valve, and the other of which is subjected to the pressure within the said rear portion of the cylinder, yielding resistance means interposed between said valve and a part connected with the piston and acting on said valve in a direction to normally close it, said resistance means having sufficient power to offer material resistance to said valves in the direction of its opening movement, when the fluid pressures on said valve are equalized and being nearly counterbalanced by the maximum differential of fluid pressures on said valve, said inlet valve being provided with a valve chamber communicating at all times with said pressure portion of the cylinder, said chamber being connected with the cylinder on the forward side of the piston, a suction connection from said portion of the cylinder to the suction passage of the engine, whereby the piston is normally submerged in vacuum, a suction valve in said chamber for disconnecting the pressure portion of the cylinder in rear of the piston, an operator operated part connected with the suction valve and arranged to be connected with the inlet valve to open it when the suction valve is closed.

19. In brake mechanism for an automotive vehicle provided with an internal combustion engine having a suction passage, a throttle valve and carburetor, a power actuator comprising a cylinder closed at both ends and a piston therein connected with the brake mechanism for the vehicle, the combination with controlling valve mechanism including a valve casing connected with and movable with the piston, and having portions connected respectively with a source of higher pressure and with the portion of the cylinder in rear of the piston, an inlet valve for disconnecting the cylinder from the source of higher pressure located in said casing and movable with respect thereto, said valve having opposite faces, means for exposing approximately the total area of one face at all times to the higher fluid pressure in a direction to open the valve, and the other face being subjected to the pressure within the rear portion of the cylinder, yielding resistance means interposed between said valve and a part connected with the piston and acting on said valve in a direction to normally close it, said resistance means having sufficient power to offer material resistance to said valve in the direction of its opening movement, when the fluid pressures on said valve are equalized and being nearly counterbalanced by the maximum differential of fluid pressures on said valve, said valve being provided with a valve chamber communicating at all times with the rear portion of the cylinder in rear of the piston, said chamber being connected with the suction passage of the engine, a suction valve in said chamber having one face exposed at all times to suction and the other face exposed to the pressure in the cylinder in rear of the piston, and an operator operated part connected with the suction valve and arranged to be connected with the inlet valve to open it when the suction valve is closed.

20. In brake mechanism for automotive vehicles, the combination with a power actuator comprising a cylinder closed at both ends, and a piston in said cylinder provided with means for connecting it with brake mechanism of the vehicle, of controlling valve mechanism, comprising a valve casing, a higher pressure inlet valve and a suction valve movable with and with respect to said piston and with respect to each other, an operator operated part operatively connected with said valves by means for effecting the opening of one after closing the other when moved in either direction, said inlet valve having portions in sealing engagement with the casing, the portions of said casing on opposite of said valve being connected respectively with the portion of the cylinder in rear of the piston, and with a source of higher fluid pressure, means for exposing approximately the full pressure area of one of the faces of said valve at all times to the higher fluid pressure in a direction to open said valve, the other of said faces being subjected to the pressure within the cylinder on the rear side of the piston, yielding resistance means acting in a direction to normally close said valve against said higher fluid pressure, said resistance means having sufficient power to offer material resistance to the movement of the operator operated part in a direction to open said valve, and apply the brakes when the pressures on said valve are equalized, and being nearly counterbalanced by the maximum differential of fluid pressures on the opposite faces of said valve, said valve being provided with a valve chamber communicating at all times with the rear portion of the cylinder, said chamber being connected with the source of lower pressure, and a suction valve in said chamber for disconnecting the rear portion of the cylinder from the suction passage when the valve is closed, and having one face exposed at all times to the lower fluid pressure and the other face exposed to the pressure in the rear portion of the cylinder.

21. In brake mechanism for automotive vehicles, the combination with a power actuator comprising a cylinder closed at both ends, and a piston in said cylinder provided with means for connecting it with brake mechanism of the vehicle, of controlling valve mechanism, comprising a valve casing, a higher pressure inlet valve and a suction valve movable with and with respect to said piston and with respect to each other, an operator operated part operatively connected with said valves by means for effecting the opening of one after closing the other when moved in either direction, the portions of said casing on opposite sides of said valve being connected respectively with the portion of the cylinder in rear of the piston, and with a source of higher fluid pressure, means for exposing approximately the full pressure area of one of the faces of the inlet valve at all times to the higher fluid pressure in a direction to open said valve and the other of said faces to the pressure within the cylinder on the rear side of the piston, yielding resistance means acting in a direction to normally close said valve against said higher fluid pressure, said resistance means having sufficient power to offer material resistance to the movement of the operator operated part in a direction to open said valve when the pressures on said valves are equalized and being nearly counterbalanced by the maximum differential of fluid pressures on the opposite faces of said valve, said valve being provided with a valve chamber communicating at all times with the rear portion of the cylinder, means for connecting the portion of the cylinder forward of the piston with a source of lower pressure, whereby the piston is normally maintained submerged in vacuum, said chamber being connected with the cylinder forward of the piston, said suction valve arranged in said chamber for disconnecting the rear portion of the cylinder from the portion of the cylinder connected with the source of lower fluid pressure, and having one face exposed at all times to the lower fluid pressure and the other face exposed to the pressure in said rear portion of the cylinder.

22. In brake mechanism for automotive vehicles, the combination with a power actuator comprising a cylinder closed at both ends, and a piston in said cylinder provided with means for connecting it with brake mechanism of the vehicle, of controlling valve mechanism comprising a valve casing in the piston, a higher pressure inlet valve and a suction valve movable with and with respect to said piston and with respect to each other, an operator operated part operatively connected with said valves by means for effecting the opening of one after closing the other when moved in either direction, the portions of said casing on opposite sides of said valve being connected respectively with the portion of the cylinder in rear of the piston, and with a source of higher fluid pressure, said valve having opposite faces, means for exposing approximately the full pressure area of one of said faces at all times to the higher fluid pressure in a direction to open said valve and the other of said faces to the pressure within the cylinder on the rear side of the piston, yielding resistance means acting in a direction to normally close said valve against said higher fluid pressure, said resistance means having sufficient power to offer material resistance to the movement of the operator operated part in a direction to open said valve, and apply the brakes when the pressures on said valves are equalized and being nearly counterbalanced by the maximum differential of fluid pressures on the opposite faces of said valve, said valve being provided with a valve chamber communicating at all times with the rear portion of the cylinder, said chamber being connected with the source of lower pressure; said suction valve arranged in said chamber for disconnecting the rear portion of the cylinder from the suction passage when the valve is closed, and having one face exposed at all times to the lower fluid pressure and the other face exposed to the pressure in the rear portion of the cylinder, the connection between said valves and the operator operated part including a valve actuating part extending through a portion of the piston and through one end of the cylinder, sealing means in the end of the cylinder and in the piston engaging said valve actuating part, and a retracting spring for said lower pressure valve having sufficient strength to overcome the frictional resistance of said sealing means upon the valve actuating part, to maintain the said valve in open position when released by the operator operated part after an application of the brakes and opened by the differentials of pressure.

In testimony whereof we affix our signatures.

CALEB S. BRAGG.
        VICTOR W. KLIESRATH.